United States Patent
Jeong (10) Patent No.: US 10,427,574 B2
(45) Date of Patent: Oct. 1, 2019

(54) VEHICLE HEADREST SLIDING DEVICE

(71) Applicant: WOOBO TECH CO., LTD., Pyeongtaek-si, Gyeonggi-do (KR)

(72) Inventor: Hae Il Jeong, Incheon (KR)

(73) Assignee: Woobo Tech Co., Ltd., Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 15/778,866

(22) PCT Filed: Nov. 11, 2016

(86) PCT No.: PCT/KR2016/013001
§ 371 (c)(1),
(2) Date: May 24, 2018

(87) PCT Pub. No.: WO2017/111310
PCT Pub. Date: Jun. 29, 2017

(65) Prior Publication Data
US 2018/0345839 A1    Dec. 6, 2018

(30) Foreign Application Priority Data
Dec. 23, 2015    (KR) .......................... 10-2015-0184568

(51) Int. Cl.
| | |
|---|---|
| *B60N 2/806* | (2018.01) |
| *B60N 2/838* | (2018.01) |
| *B60N 2/841* | (2018.01) |
| *B60N 2/844* | (2018.01) |
| *B60N 2/847* | (2018.01) |
| *B60N 2/865* | (2018.01) |
| *B60N 2/80* | (2018.01) |
| *B60N 2/90* | (2018.01) |

(52) U.S. Cl.
CPC ............... *B60N 2/865* (2018.02); *B60N 2/80* (2018.02); *B60N 2/929* (2018.02); *B60N 2002/952* (2018.02)

(58) Field of Classification Search
CPC .......... B60N 2/80; B60N 2/865; B60N 2/929
USPC ...................................................... 297/408
See application file for complete search history.

(56) References Cited

U.S. PATENT DOCUMENTS

| | | | | | |
|---|---|---|---|---|---|
| 4,304,439 | A | * | 12/1981 | Terada ...................... | A47C 7/38 297/408 X |
| 4,674,792 | A | * | 6/1987 | Tamura .................. | B60N 2/847 297/408 |
| 4,674,797 | A | * | 6/1987 | Tateyama ............... | B60N 2/847 297/408 |

(Continued)

FOREIGN PATENT DOCUMENTS

| | | | | |
|---|---|---|---|---|
| DE | 3131597 A1 | * | 2/1983 | ............. B60N 2/844 |
| FR | 2556195 A1 | * | 6/1985 | ............. B60N 2/874 |

(Continued)

*Primary Examiner* — Rodney B White
(74) *Attorney, Agent, or Firm* — Sunstein Kann Murphy & Timbers LLP (57) ABSTRACT

A device for sliding a headrest towards the front direction includes a ratchet and a release lever installed in a side link which is a movable part. A release protrusion is formed in the ratchet and disposed almost in parallel with the hinge shaft of the ratchet. The release protrusion of the ratchet is pushed up to release the locking so that the headrest is returned to its original position.

4 Claims, 10 Drawing Sheets

(56) References Cited

U.S. PATENT DOCUMENTS

| | | | | |
|---|---|---|---|---|
| 4,678,232 A * | 7/1987 | Ishida | B60N 2/847 | 297/408 |
| 4,733,913 A * | 3/1988 | Tateyama | B60N 2/847 | 297/409 |
| 4,798,415 A * | 1/1989 | Tanino | B60N 2/838 | 297/408 X |
| 4,830,434 A * | 5/1989 | Ishida | B60N 2/829 | 297/408 |
| 5,228,749 A * | 7/1993 | Harrell | B60N 2/847 | 297/408 |
| 5,236,245 A * | 8/1993 | Harrell | B60N 2/847 | 297/408 |
| 5,236,246 A * | 8/1993 | Harrell | B60N 2/847 | 297/408 |
| 5,238,295 A * | 8/1993 | Harrell | B60N 2/847 | 297/408 |
| 5,964,505 A * | 10/1999 | Koenig | B60N 2/0715 | 297/408 |
| 6,000,760 A * | 12/1999 | Chung | B60N 2/806 | 297/408 |
| 6,045,181 A * | 4/2000 | Ikeda | B60N 2/847 | 297/408 X |
| 7,455,363 B2 * | 11/2008 | Chung | B60N 2/809 | 297/409 |
| 7,543,891 B2 * | 6/2009 | Chung | B60N 2/859 | 297/408 |
| 8,382,206 B2 * | 2/2013 | Grable | B60N 2/847 | 297/408 |
| 8,807,653 B2 * | 8/2014 | Yetukuri | B60N 2/847 | 297/408 |
| 8,936,310 B2 * | 1/2015 | Takayama | B60N 2/4221 | 297/408 X |
| 8,979,203 B1 * | 3/2015 | Sutter, Jr. | B60N 2/847 | 297/408 |
| 2008/0296952 A1 * | 12/2008 | Choi | B60N 2/865 | 297/391 |
| 2011/0175421 A1 * | 7/2011 | Grable | B60N 2/847 | 297/408 |
| 2011/0221250 A1 * | 9/2011 | Little | B60N 2/847 | 297/408 |
| 2013/0193736 A1 * | 8/2013 | Shimizu | B60N 2/844 | 297/391 |
| 2014/0339875 A1 * | 11/2014 | Sunaga | B60N 2/58 | 297/408 |
| 2015/0306995 A1 * | 10/2015 | Tachikawa | B60N 2/5825 | 297/408 |
| 2017/0144573 A1 | 5/2017 | Jeong | | |
| 2018/0042383 A1 * | 2/2018 | Jeong | A47C 7/38 | |

FOREIGN PATENT DOCUMENTS

| | | | | |
|---|---|---|---|---|
| JP | 59186746 A * | 10/1984 | | B60N 2/818 |
| JP | 2000-342379 A | 12/2000 | | |
| JP | 10-2010-0022677 | 3/2010 | | |
| JP | 2010-202112 A | 9/2010 | | |
| KR | 10-2010-013002 | 12/2010 | | |
| KR | 10-1144870 | 5/2012 | | |
| KR | 10-1570427 | 11/2015 | | |
| WO | WO 2010/101365 A1 | 9/2010 | | |

* cited by examiner

VEHICLE HEADREST SLIDING DEVICE

This application is the national phase entry of international patent application no. PCT/KR2016/013001 filed Nov. 11, 2016 and claims the benefit of Korean patent application No. 10-2015-0184568, filed Dec. 23, 2015, the disclosures of which are incorporated herein by reference in their entirety.

TECHNICAL FIELD

The present invention relates to a device for sliding a headrest towards the front direction, more particularly, to a headrest sliding device wherein a ratchet and a release lever are installed in a side link which is a movable part, and the protrusion of the ratchet is being pushed up to release the locking so that the headrest is returned to its original position.

BACKGROUND ART

A headrest sliding device of the prior art has been suggested, for example, as disclosed in the Patent Literature 1 (Korea Registered Patent Publication No. 10-1144870) and the Patent Literature 2 (Korea Registered Patent Publication No. 10-1570427) that had been filed earlier by the applicant(s) of this application.

Figure 1:
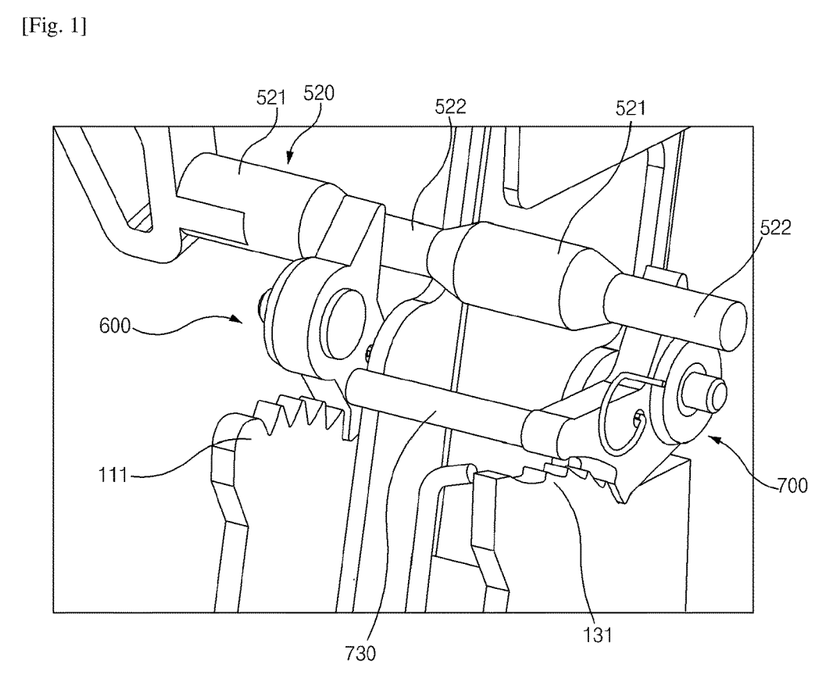
FIG. 1 is a schematic diagram of the pole and the ratchet when the shaft is not operated in the headrest sliding device of the prior art.
Figure 2:
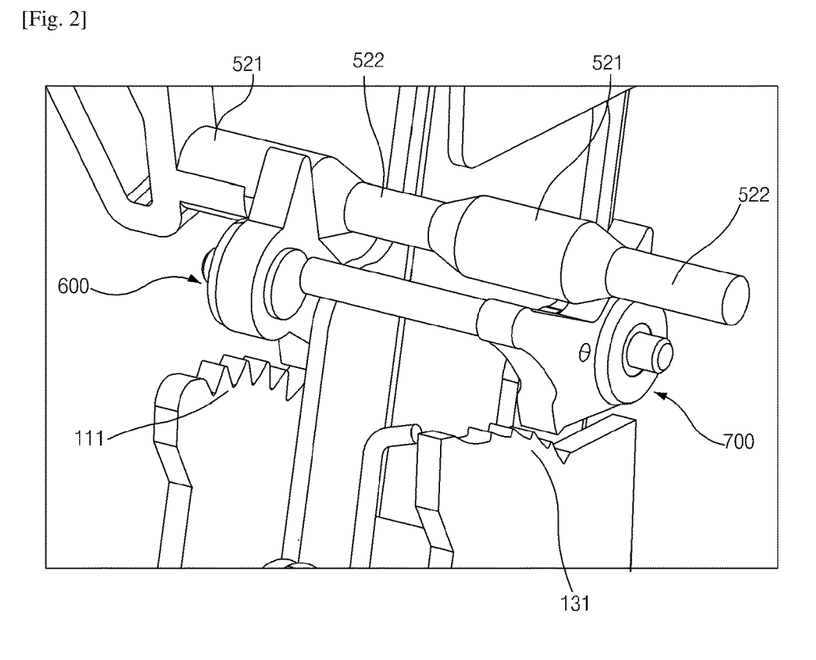
FIG. 2 is a schematic diagram of the pole and the ratchet when the shaft is operated in FIG. 1.

The mechanism of the headrest sliding device of the Patent Literature 1 is that if a headrest is to be returned to its original position from the locking state established after it is moved to a desired position by a user as shown in FIG. 1, the shaft unit 520 is pushed towards the direction of the rotating axis of the poles 600 and 700 so that the contact points thereof are shifted from the small-diameter shaft portion 522 to the large-diameter shaft portion 521 so as to lift up the poles 600 and 700, thereby releasing the locking.

That is, since the locking is released by a cam-like structure wherein the shaft unit 520 is being pushed and pulled along the direction of the rotating axis of the poles 600 and 700, there is an inconvenience in that since the shaft unit 520 must be slided along the right angle direction with respect to the pressing force of the poles 600 and 700, a large initial force must be applied for pressing.

Figure 3:
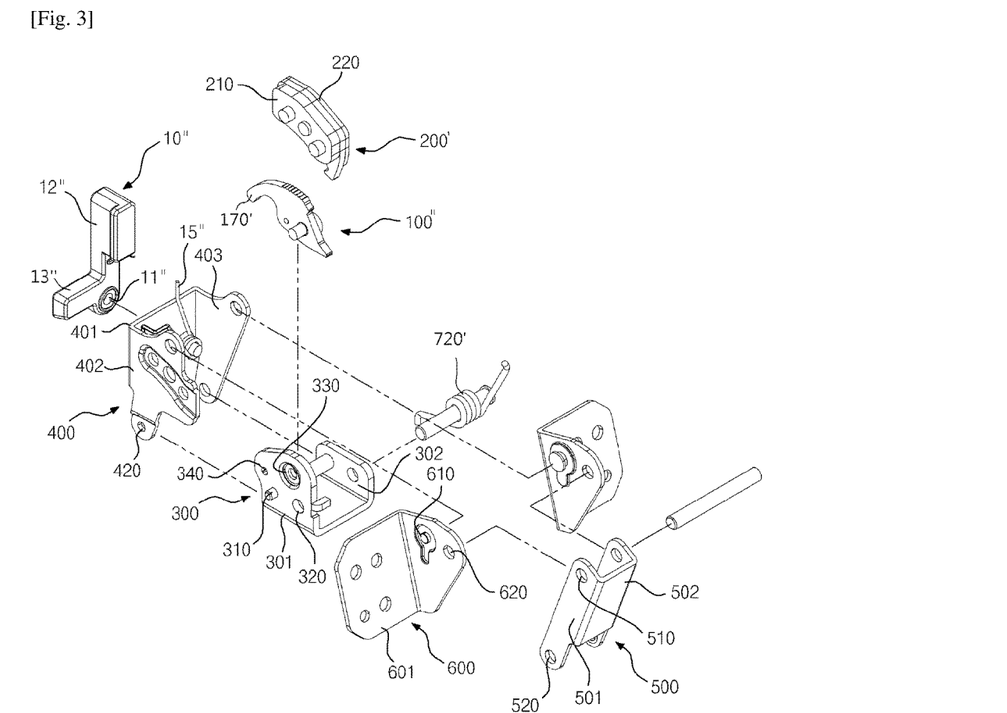
FIG. 3 is an exploded perspective view illustrating another headrest sliding device of the prior art.

In the headrest sliding device of the Patent Literature 2, as illustrated in FIG. 3, a lever member 10" is rotatably supported at the second link 400 which is a movable part, and the pole 100" is supported at the lower side link 300 which is a fixed part.

Figure 4:
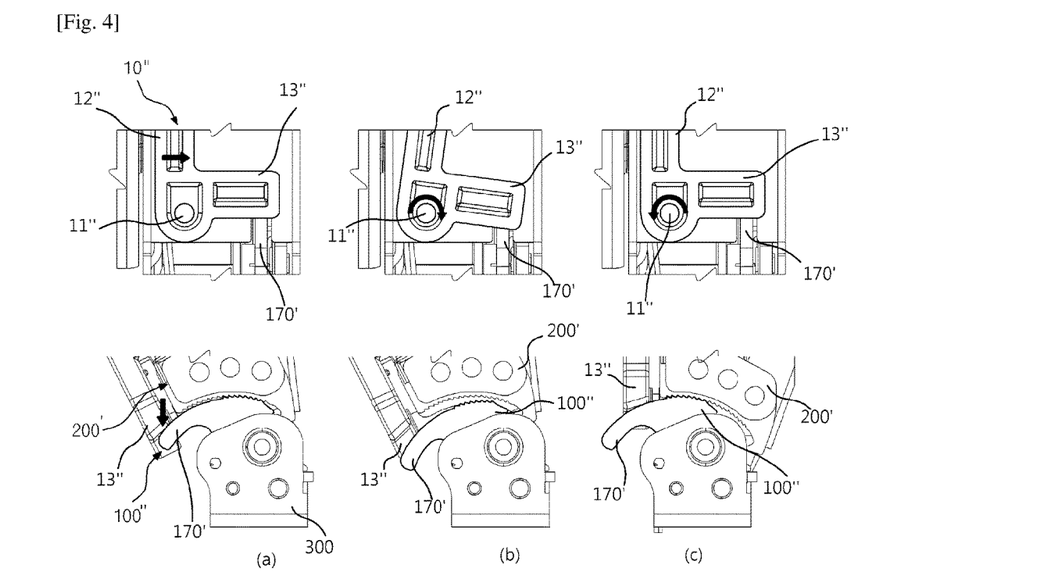
FIG. 4 is an operational state illustrating a state wherein the gearing between the pole and the ratchet is released by using a lever member of the headrest moving device of FIG. 3.

In this way, since the lever member 10" is supported at the second link 400 which is a movable part, and the pole 100" is supported at the lower side link 300 which is a fixed part, the point in the stopping protrusion 170', where the pressing portion 13" of the lever member 10" should press, becomes different during the process of releasing the gearing between the pole and the ratchet, as illustrated in FIG. 4, therefore, the stopping protrusion 170' of the pole 100" is externally protruded long in length and affects the limited thickness of the headrest undesirably.

DISCLOSURE OF INVENTION

Technical Problem

An objective of the present invention, devised to solve the above described problems, is to provide a headrest sliding device for easily releasing the locking of the ratchet and enabling the miniaturization of the ratchet.

Solution to Problem

To achieve the above described objective, a headrest sliding device of an embodiment of the present invention comprises: a lower side bracket wherein teeth are formed along the front to rear direction and being fixed to a stay; a front side link whose lower portion is rotatably connected to the front side of the lower side bracket through a first front side hinge shaft; a rear side link whose lower portion is rotatably connected to the rear side of the lower side bracket through a first rear side hinge shaft; a left side link and a right side link connected to the left and the right sides of the upper sides of the front side link and the rear side link through a second front side hinge shaft and a second rear side hinge shaft, respectively; a return spring for applying a restoring force to the front side link with respect to the lower side bracket; a ratchet disposed in either one of the left side link and the right side link so as to be engaged with the teeth, and being supported by a rotation axis along the left to right direction; a release protrusion formed in the ratchet; and a release lever which is supported at the side link wherein the ratchet is supported, and releases the gearing state by lifting up the release protrusion when an external force is applied thereto.

In a headrest sliding device of an embodiment of the present invention, the left side link comprises: a left side plate supported at the left upper side of the front side link and the rear side link; a left coupling plate outwardly bended from the front of the left side plate; and the right side link comprises: a right side plate supported at the right upper side of the front side link and the rear side link; a right coupling plate outwardly bended from the front of the right side plate; and a release support plate outwardly bended from the one side of the rear of the right side plate and supporting the release lever, wherein the ratchet is disposed in the outer side of the right side plate.

In a headrest sliding device of an embodiment of the present invention, the release lever comprises: a release link supported at the release support plate through a third hinge shaft; a release bottom plate formed in the one end of the release link and disposed in the lower surface of the release protrusion; and a pressing plate, formed in the other end of the release link, to which the external force is applied.

In a headrest sliding device of an embodiment of the present invention, the front side link comprises: a front plate; a left front side plate and a right front side plate backwardly bended from the left side and the right side of the front plate respectively; a left first front side hinge bracket, a right first front side hinge bracket, a left second front side hinge bracket, and a right second front side hinge bracket in the lower end and the upper end of the left front side plate and the right front side plate, wherein the first front side hinge shaft and the second front side hinge shaft are mounted respectively; and the rear side link comprises: a rear plate; a left rear side plate and a right rear side plate forwardly bended from the left side and the right side of the rear plate respectively so as to face the left front side plate and the right front side plate respectively; and a left first rear side hinge bracket and a right second rear side hinge bracket formed in the lower ends and the upper ends of the left rear side plate and the right rear side plate respectively, wherein it is preferred that the left front side plate and the right front side plate are in contact with the upper sides of the left rear side plate and the right rear side plate respectively when the front side link and the rear side link are returned to their original position.

In a headrest sliding device of an embodiment of the present invention, protrusions are formed in the upper end surfaces of the left front side plate and the right front side plate, and slots are formed in the upper end surfaces of the left rear side plate and the right rear side plate where the protrusions are contacted with.

Advantageous Effects of Invention

According to a headrest sliding device of the present invention, there are advantageous effects as follows.

By implementing a locking release mechanism wherein the locking is released by rotating the ratchet when it is being pushed upward from the lower surface of the release protrusion formed in the ratchet, only a slight pushing up of the ratchet towards the direction of rotation of the ratchet is sufficient (to release the locking), so, it is very convenient for a user since the locking can be easily released without requiring a large force for rotating operation of the ratchet.

In addition, since the ratchet and the release lever are supported by the side link which is a movable part, the operation is performed without a difference in the rotating radius so that the pressing position is not changed, thereby enabling the miniaturization of the ratchet.

Also, the ratchet and the release lever are supported at the outer side of the side link which is a movable part so that the front side link and the rear side link can be implemented as a pair facing each other, and thus, when the front side link and the rear side link are returned to their original position, the upper sides of the left front side plate and the right front side plate of the front side link, and the upper sides of the left rear side plate and the right rear side plate of the rear side link having different rotating radiuses are already in contact with one another respectively and being stopped thereby, so that itself plays the role of a safety device functioning as stopper even the ratchet is not engaged while the release lever is being pressed continuously. Accordingly, the durability of the ratchet is enhanced since it does not require application of a large force at the initial state (that is, returned state) for engaging the ratchet with the teeth, and also, the teeth may not have to be large in order to sufficiently support the ratchet.

Especially, since protrusions are formed in the upper end surfaces of the left front side plate and the right front side plate, and slots are formed in the upper end surfaces of the left rear side plate and the right rear side plate wherein the protrusions are contacted, thus, owing to such holding structures, unlike the bare contact the stopper function can be maintained maximally even if the release lever is pressed continuously.

MODE FOR THE INVENTION

Hereinafter, the preferred exemplary embodiments of the present invention will be described in detail with reference to the accompanying drawings.

For reference, the components of the present invention which will be described hereinafter and are same as those of the prior art will not be described in detail separately, but instead, will be referred to the prior art described above.

In addition, it is defined in a way that the front to rear direction is x-axis, the left to right direction is y-axis, and the up and down direction is z-axis.

Figure 5:
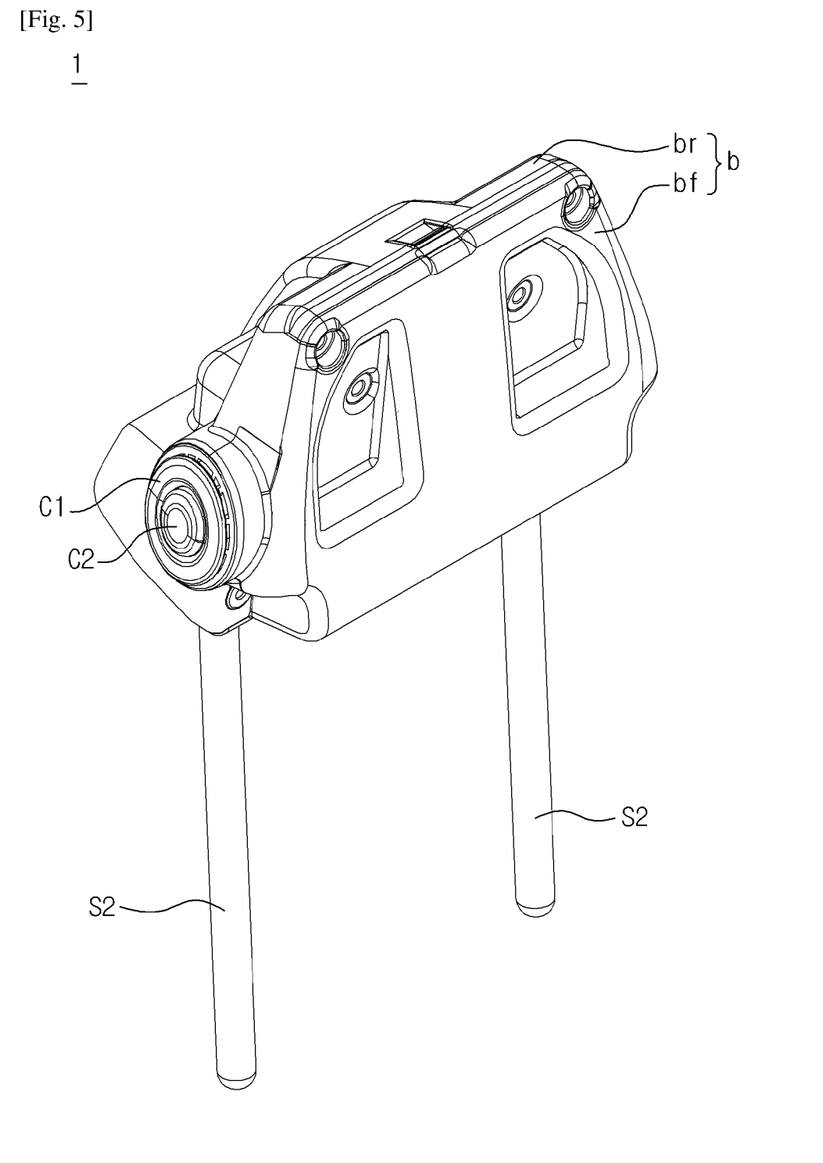
FIG. 5 is an assembled perspective view of a headrest sliding assembly according to a preferred exemplary embodiment of the present invention.
Figure 6:
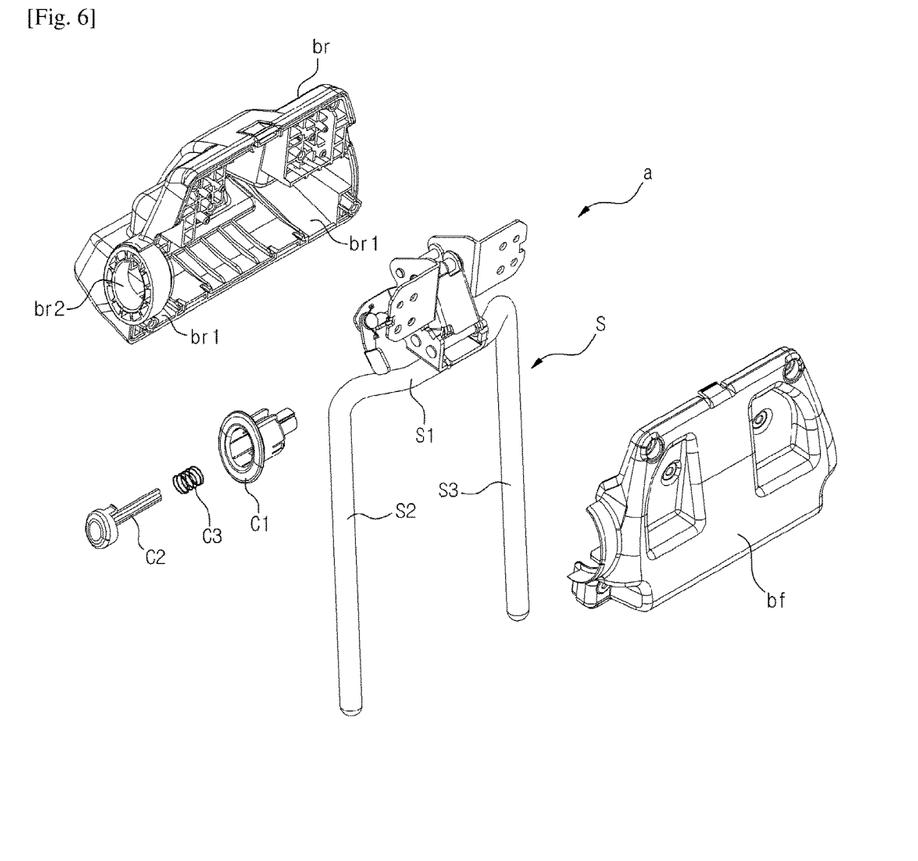
FIG. 6 is an exploded perspective view of FIG. 5.
Figure 7:
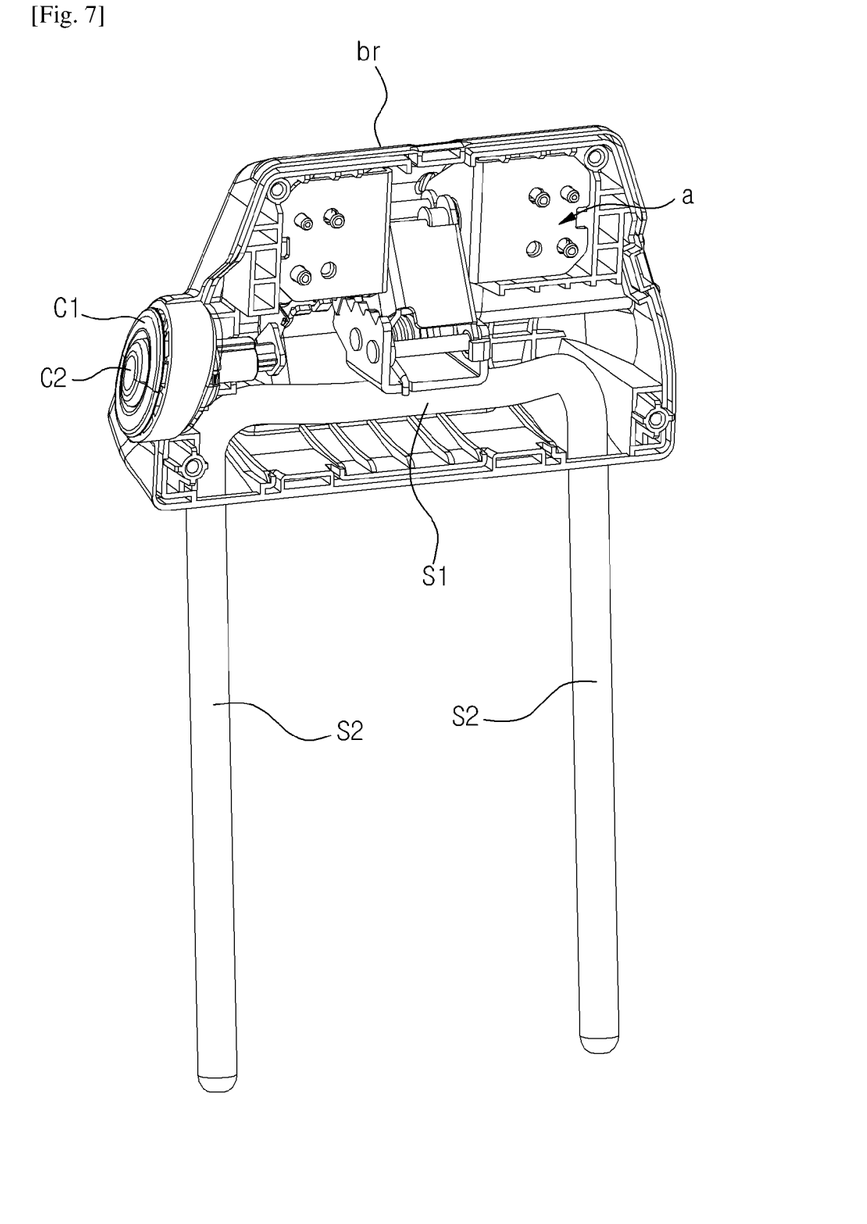
FIG. 7 is a perspective view wherein the front cover is removed from FIG. 5.
Figure 8:
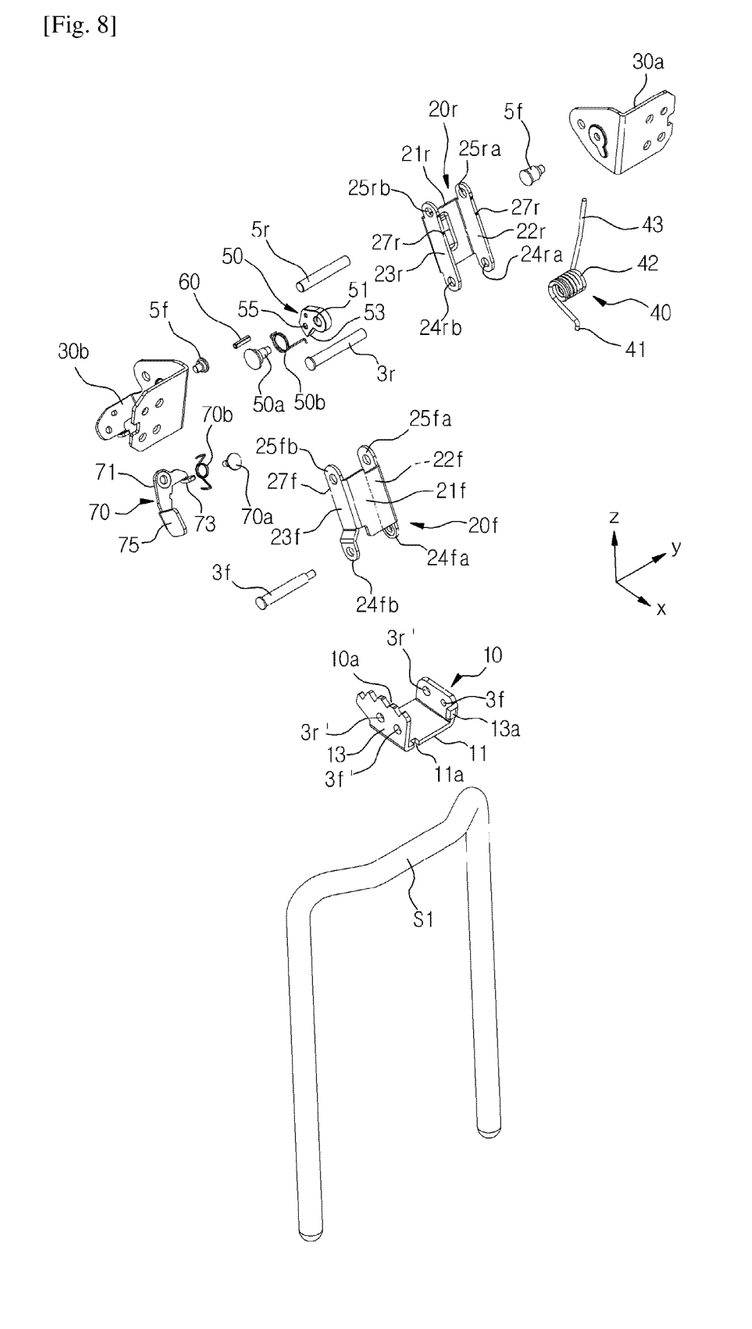
FIG. 8 is an exploded perspective view illustrating the headrest sliding device of FIG. 6.
Figure 9:
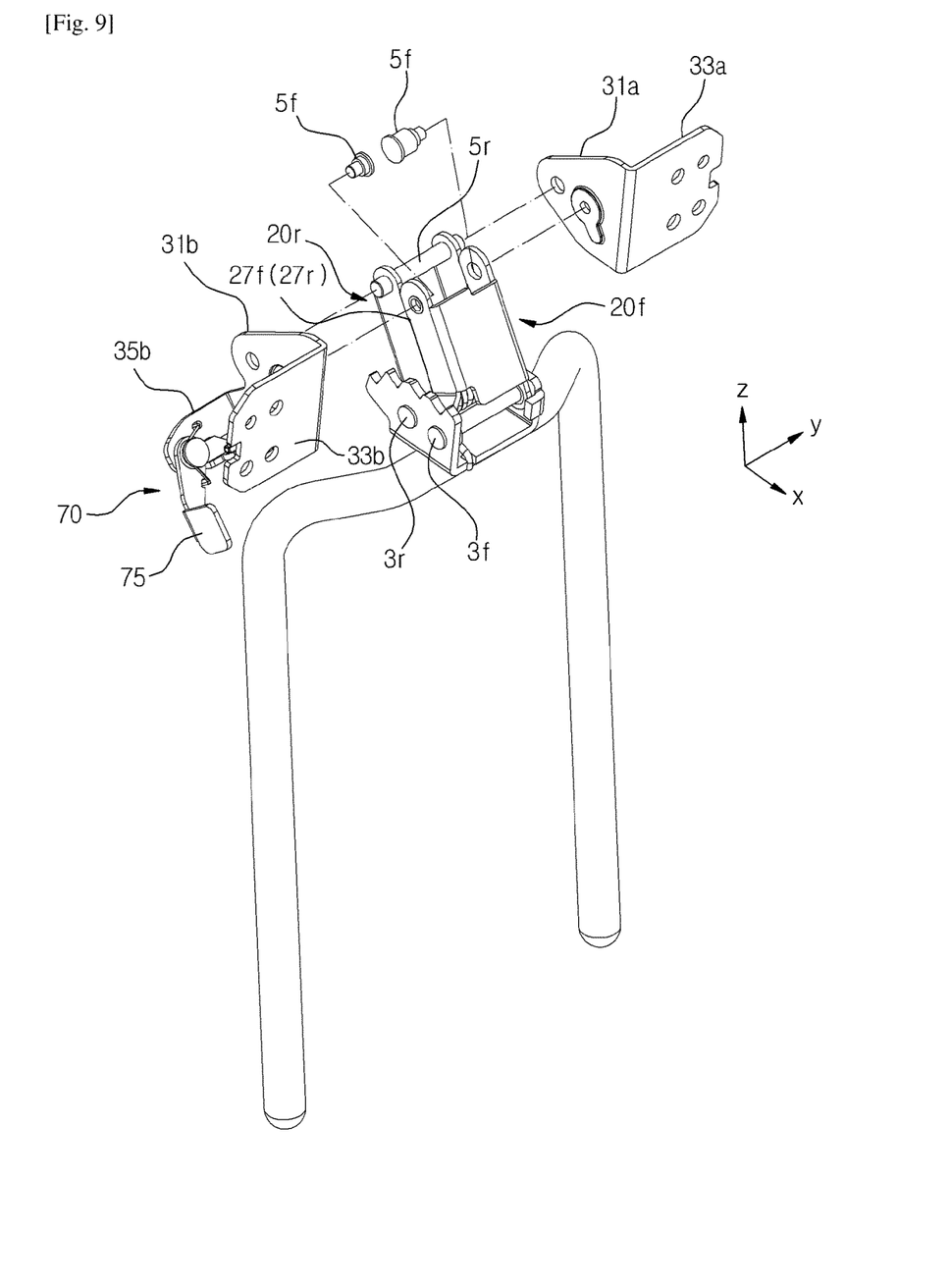
FIG. 9 is an exploded perspective view illustrating the coupling states of the major parts in FIG. 8.
Figure 10:
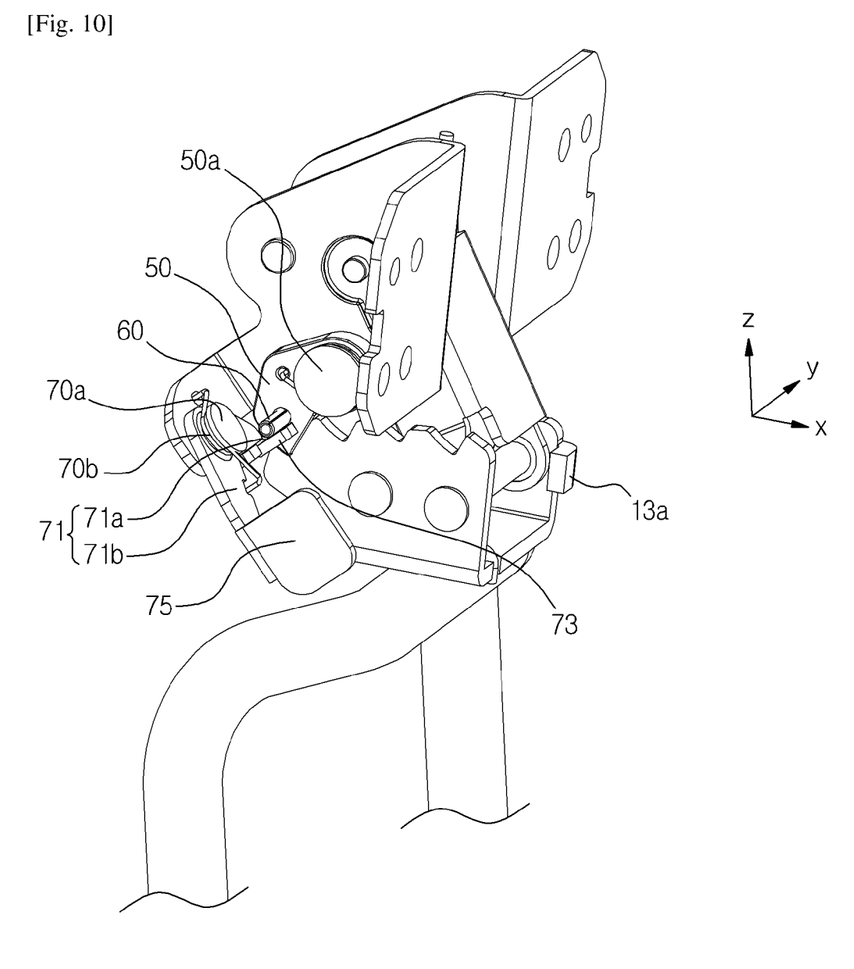
FIG. 10 is an assembled perspective view of FIG. 9.
Figure 11:
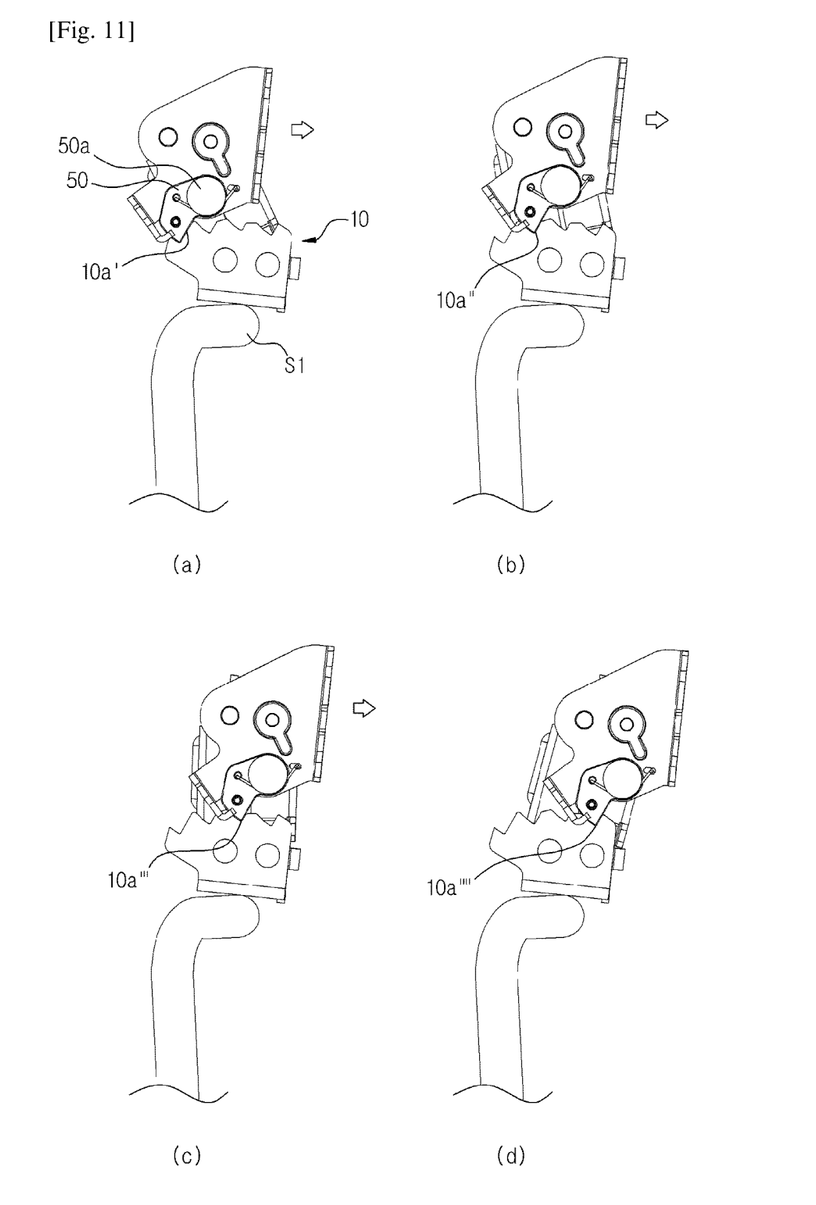
FIG. 11 is a side view illustrating the steps of sliding of the headrest towards the front direction.
Figure 12:
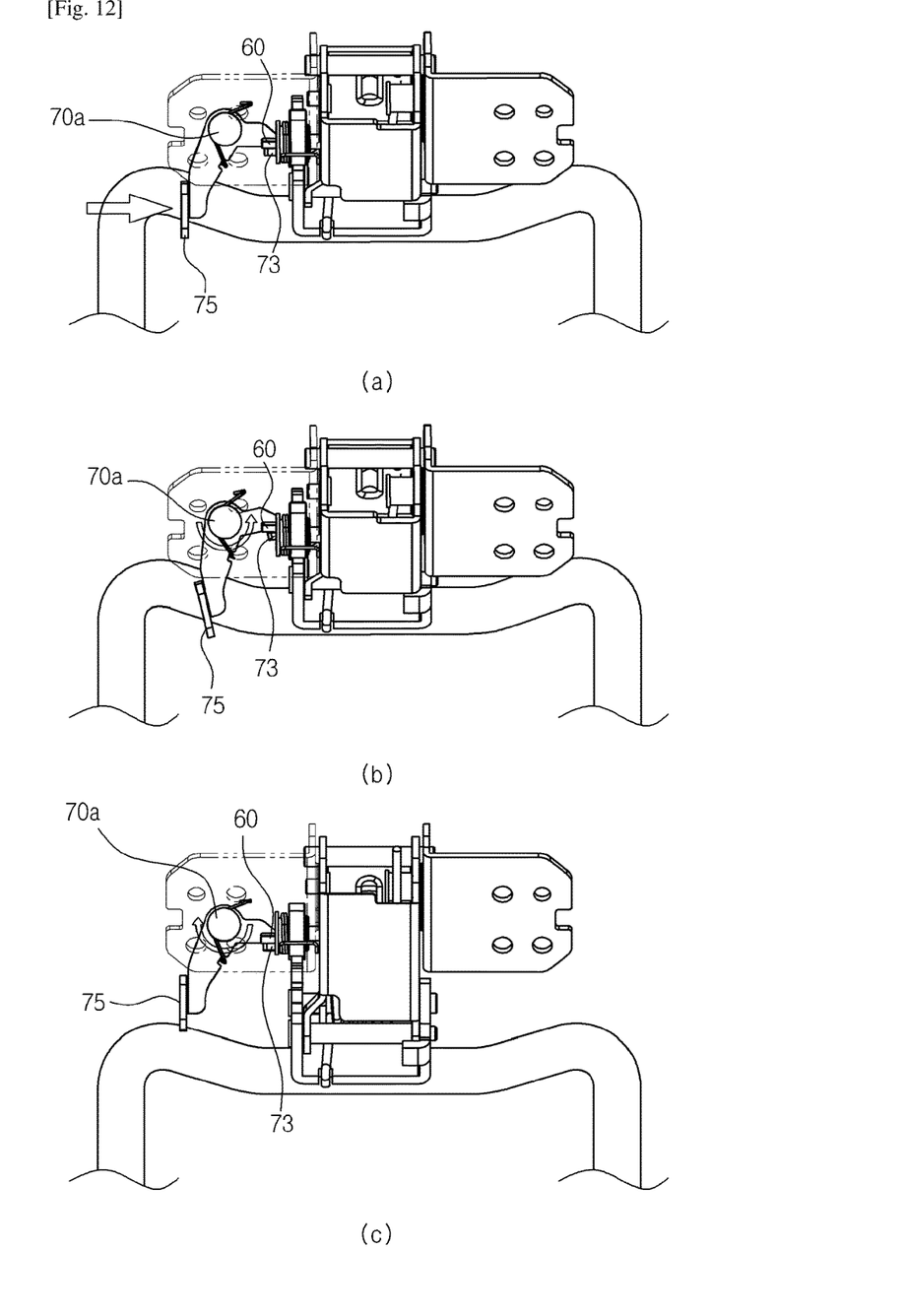
FIG. 12 is a front view illustrating the steps of returning of the headrest towards the rear direction.

FIG. 5 is an assembled perspective view of a headrest sliding assembly according to a preferred exemplary embodiment of the present invention; FIG. 6 is an exploded perspective view of FIG. 5; FIG. 7 is a perspective view wherein the front cover is removed from FIG. 5; FIG. 8 is an exploded perspective view illustrating the headrest sliding device of FIG. 6; FIG. 9 is an exploded perspective view illustrating the coupling states of the major parts in FIG. 8; FIG. 10 is an assembled perspective view of FIG. 9; FIG. 11 is a side view illustrating the steps of sliding of the headrest towards the front direction; and FIG. 12 is a front view illustrating the steps of returning of the headrest towards the rear direction.

As illustrated in FIGS. 5 to 7, a headrest sliding assembly 1 mainly comprises: a headrest sliding device a; a cover b covering the headrest sliding device a; and a button unit c mounted in the cover b for applying an external force so that the headrest sliding device a is returned to its original position.

The headrest sliding device a is supported at the upper surface of a horizontal bar s1 of a stay s.

The cover b comprises a front cover bf and a rear cover br which are screw-coupled.

A receiving portion is formed in the rear cover br for receiving most of the headrest sliding device a, and a pulling-out hole br1 is formed in the lower surface for pulling out a horizontal bar s2 of the stay s.

Preferably, the pulling-out hole br1 is an elongated hole formed along the front to rear lengthwise direction.

In addition, a mounting hole br2 is formed at the left side of the rear cover br for mounting the button unit c.

The button unit c comprises: a bezel c1 being inserted into the mounting hole br2 and mounted thereto; a button c2 being fit into the bezel c1 so as to be slided along the left to right direction; and a return spring c3 for returning the button c2 to its original position with respect to the bezel c1.

The headrest sliding device a, as illustrated in FIGS. 8 to 10, comprises: a lower side bracket 10 being fixed to a horizontal bar s1 of a stay s and formed with teeth 10a; a front side link 20f whose lower portion is rotatably connected to the front side of the lower side bracket 10 through a first front side hinge shaft 3f; a rear side link 20r whose lower portion is rotatably connected to the rear side of the lower side bracket 10 through a first rear side hinge shaft 3r; a left side link 30a and a right side link 30b connected to the left and the right upper sides of the front side link 20f and the upper side of the rear side link 20r through a second front side hinge shaft 5f and a second rear side hinge shaft 5r, respectively; a return spring 40 for applying a restoring force to the rear side link 20r with respect to the lower side bracket 10; a ratchet 50 disposed in either one of the left side link 30a and the right side link 30b so as to be engaged with the teeth 10a, and supported by a rotation axis (y-axis) along the left to right direction; a release protrusion 60 formed in the ratchet 50; and a release lever 70 for lifting up the release protrusion 60.

The lower side bracket 10 comprises: a lower plate 11 whose lower surface is welded or assembled to the upper surface of the horizontal bar s1 and fixed thereto; and a left plate 13 and a right plate 15 which are upwardly protruded from the left and the right side of the lower plate 11 respectively.

A slot 11a is formed at one side of the front end of the lower plate 11, wherein one end 41 of the return spring 40 is being held.

The other end 43 of the return spring 40 is held by the second front side hinge shaft 5f, thereby practically applying a restoring force to the front side link 20f.

A first front side hinge hole 3f and a first rear side hinge hole 3r' at which a first front side hinge shaft 3f and a first rear side hinge shaft 3r are supported are formed in parallel in the left plate 13 and the right plate 15.

A stopper 13a wherein the front side link 20f is held is formed in the front end of the left plate 13.

The stopper 13a plays the role of an upper limit stopper which allows maximum stay at the sliding position when sliding forward.

The teeth 10a are formed in the upper end of the right plate 15, and 4 teeth are formed for the steps of 0 to 3.

The front side link 20f comprises: a front plate 21f; a left front side plate 22f and a right front side plate 23f backwardly bended from the left and the right sides of the front plate 21f respectively, and in the lower and the upper ends of the left front side plate 22f and the right front side plate 23f, a left first front side hinge bracket 24fa, a right first front side hinge bracket 24fb, a left second front side hinge bracket 25fa, and a right second front side hinge bracket 25fb having hinge holes wherein the first front side hinge shaft 3f and the second front side hinge shaft 5f are mounted respectively.

Especially, since the right first front side hinge bracket 24fb is outwardly and slantly bended and then extended downwardly and vertically, so that the movement of the headrest along the left to right direction (y-axis) can be prevented.

The rear side link 20r to have a configuration corresponding to the front side link 20f comprises: a rear plate 21r facing the front plate 21f; a left rear side plate 22r and a right rear side plate 23r forwardly bended from the left and the right sides of the rear plate 21r respectively so as to face the left front side plate 22f and the right front side plate 23f respectively; and in the lower and the upper ends of the left rear side plate 22r and the right rear side plate 23r, a left first rear side hinge bracket 24ra, a right first rear side hinge bracket 24rb, a left second rear side hinge bracket 25ra, and a right second rear side hinge bracket 25rb having hinge holes wherein the first rear side hinge shaft 3r and the second rear side hinge shaft 5r are mounted respectively.

In this way, the front side link 20f and the rear side link 20r are configured to correspond to each other, so that when the front side link 20f and the rear side link 20r are returned to their original position, the upper sides of the left front side plate 22f and the right front side plate 23f of the front side link 20f, and the upper sides of the left rear side plate 22r and the right rear side plate 23r are already in contact with one another respectively since the rotating radius of the first front side hinge shaft 3f and the rotating radius of the first rear side hinge shaft 3r are different from each other, thus it can be functioned as a second stopper for a return operation.

In order to assure the function as a second stopper for a return operation, protrusions 27f are formed in the upper end surfaces of the left front side plate 22f and the right front side plate 23f, and slots 27r where the protrusions 27f are contacted with are formed in the upper end surfaces of the left rear side plate 22r and the right rear side plate 23r.

Thus, the protrusions 27f and the slots 27r are functioning as stopping thresholds for each other as shown in FIG. 9, so that the stopper function is assured with such a holding structure rather than a simple bare contact.

The left side link 30a comprises: a left side plate 31a supported at the second front side hinge shaft 5f and the second rear side hinge shaft 5r in the left upper sides of the front side link 20f and the rear side link 20r; and a left coupling plate 33a outwardly bended from the front sides of the left side plate 31a.

The right side link 30b comprises: a right side plate 31b supported at the second front side hinge shaft 5f and the second rear side hinge shaft 5r in the right upper sides of the front side link 20f and the rear side link 20r; and a right coupling plate 33b outwardly bended from the front sides of the right side plate 31b; and a release support plate 35b outwardly bended from the one side of the rear side of the right side plate 31b at where the release lever 70 is supported.

The installation angle of the release support plate 35b is preferred to be disposed at an angle equal to the slant angle of the front side link 20f and the rear side link 20r at the initial state (step 0) without any sliding movement. (Refer to FIG. 9.)

A rotating hole 51 is formed in the front side of the ratchet 50, and a pole 53 is formed in the rear side.

The pole 53 is engaged with the teeth 10a step by step.

Also, a release protrusion 60 is formed between the rotating hole 51 and the pole 53, more particularly, in a place near the pole 53.

The release protrusion 60 is a pin, and preferably inserted into an insertion slot 55 and fixed thereto.

The ratchet 50 is supported at the outer side of the right side plate 31b by a hinge shaft 50a of the ratchet having a rotating axis (y-axis).

Thus, since the release protrusion 60 is disposed almost in parallel with the hinge shaft 50a of the ratchet, the ratchet 50 is swiftly rotated along the hinge shaft 50a of the ratchet when the lower surface of the release protrusion 60 is pushed up, therefore, the operation is performed smoothly for a user without using a strong pressing force for the return operation.

In addition, a locking spring 50b is further installed in order to apply an elastic force towards the direction of locking intended by the ratchet 50.

The locking spring 50b is a twisted coil spring whose one end is supported at the ratchet 50 and the other end is supported at the right side plate 31b while it is wound around the hinge shaft 50a of the ratchet.

The release lever 70 comprises: a release link 71 supported at a release support plate 35b through a hinge shaft 70a of the lever; a release lower plate 73 formed in the one end (right side) of the release link 71 and disposed in the lower surface of a release protrusion 60; and a pressing plate 75, formed in the other end of the release link 71, to which an external force is applied.

The release link 71 having a triangular shape with an obtuse angle comprises: a first release link 71a formed with the release lower plate 73; and a second release link 71b formed with the pressing plate 75.

The hinge shaft 70a of the lever, while being supported at the apex where the first release link 71a and the second release link 71b meet, is rotatably supported at the release support plate 35b.

In addition, a lever spring 70b which is a twisted coil spring is further installed in the release lever 70.

The one end and the other end of the lever spring 70b, while its coil portion is being inserted in the hinge shaft 70a of the lever, are held by the second release link 71b and the release support plate 35b.

Since all of the ratchet 50 and the release lever 70 are installed in the right side link 30b which is a movable part, the direction of pushing up the protrusion 60 of the ratchet 50 by the release lever 70 is consistent; therefore, the overall size can be designed compactly.

The operation will be described according to the configuration of the above described headrest sliding device a.

First, the steps of forward sliding will be described with reference to FIG. 11.

As illustrated in FIG. 11(a), the pole 53 of the ratchet 50 is geared with the teeth 10a' of the lower side bracket 10 (Step 0).

When the headrest is pulled forward in Step 0 as shown in FIG. 11(a), the pole 53 of the ratchet 50 is geared with the second tooth 10a'' of the lower side bracket 10 as shown in FIG. 11(b), which is the first step (Locking Step 1).

When the headrest is further pulled forward in Step 1, the pole 53 of the ratchet 50 is geared with the third tooth 10a''' of the lower side bracket 10 as shown in FIG. 11(c), which is the second step (Locking Step 2).

When the headrest is still further pulled forward in Step 2, the pole 53 of the ratchet 50 is geared with the fourth tooth 10a'''' of the lower side bracket 10 as shown in FIG. 11(d), which is the third step (Locking Step 3).

When the headrest is yet still further pulled forward in FIG. 11(d), the front side link 20f is held by a stopper 13a.

The both ends of the return spring 40, which is a main spring, are getting closer as the steps are proceeded from Step 0 to Step 3; and at the moment when the locking is released, it is returned to its original position, which is Step 0, by the restoring elastic force.

The processes of releasing such locking state and restoring the original position will be described with reference to FIG. 12.

In order to return to its original position as shown in FIG. 11(a) from the locking position of FIG. 11(b), FIG. 11(c), or FIG. 11(d), a button c2 in FIG. 12(a), the positions of the elements therein are the same as FIG. 11(d), is pressed.

The pressed button c2 presses the pressing plate 75 as shown in FIG. 12(b), and the pressing plate 75 is rotated by the hinge shaft 70a of the lever, and thus, the release lower plate 73 is rotated together.

The rotation of the release lower plate 73 enables the protrusion 60 to rotate the ratchet 50 with respect to the rotating axis 50a and push it upward, thereby releasing the locking.

At the moment when the locking is released, the headrest sliding device c is slided backward due to the reaction of the elastic restoring force of the return spring 40, and then it becomes an initial state as shown in FIG. 12(c).

At this time, in order to prevent the sliding backward even the button c2 is being pressed continuously, not only the first front side hinge bracket 24fb is held on a first rear side hinge shaft 3r, but also the protrusions 27f and the slots 27r of the front side link 20f and the rear side link 20r are in contact with one another, thereby providing dual up and down stopper functions for the stabilization of the device.

FIG. 12(a) shows the same position (Step 3) as FIG. 11(d), and FIG. 12(c) shows the same position (Step 0) as FIG. 11(a).

As described above, although the present invention has been described with reference to the preferred exemplary embodiments, various changes and alterations of the present invention can be made by those skilled in the art without departing from the spirit and the scope of the present invention written in the claims described herein below.

DESCRIPTION OF SYMBOLS

3f: first front side hinge shaft
5f: second front side hinge shaft
3r: first rear side hinge shaft
5r: second rear side hinge shaft
10: lower side bracket
10a: teeth
20f: front side link
20r: rear side link
30a: left side link
30b: right side link
40: return spring
50: ratchet
60: release protrusion
70: release lever
71: release link
73: release lower plate
75: pressing plate
S: stay

The invention claimed is:

1. A headrest sliding device comprising:
a lower side bracket wherein teeth are formed along the front to rear direction and being fixed to a stay;
a front side link whose lower portion is rotatably connected to a front side of the lower side bracket through a first front side hinge shaft;
a rear side link whose lower portion is rotatably connected to a rear side of the lower side bracket through a first rear side hinge shaft;
a left side link and a right side link connected to a left upper side and a right upper side of the front side link and the rear side link through a second front side hinge shaft and a second rear side hinge shaft, respectively;
a return spring for applying a restoring force to the front side link with respect to the lower side bracket;
a ratchet disposed in either one of the left side link and the right side link so as to be engaged with the teeth, and being supported by a hinge shaft of the ratchet having a rotation axis along the left to right direction;

a release protrusion formed in the ratchet and disposed almost in parallel with the hinge shaft of the ratchet; and a release lever which is supported at either one of the left side link and the right side link wherein the ratchet is supported, and releases the gearing state by lifting up the release protrusion when an external force is applied thereto, wherein the release lever comprises:

a release link supported at the release support plate through a third hinge shaft;

a release bottom plate formed in a first end of the release link and disposed in a lower surface of the release protrusion; and a pressing plate, formed in a second end of the release link, to which the external force is applied.

2. The headrest sliding device according to claim 1, wherein the left side link comprises:

a left side plate supported at the left upper side of the front side link and the rear side link;

a left coupling plate outwardly bent from the front of the left side plate; and wherein the right side link comprises:

a right side plate supported at the right upper side of the front side link and the rear side link;

a right coupling plate outwardly bent from the front of the right side plate; and a release support plate outwardly bent from a side of the rear of the right side plate and supporting the release lever, wherein the ratchet is disposed in an outer side of the right side plate.

3. The headrest sliding device according to claim 1, wherein the front side link comprises:

a front plate;

a left front side plate and a right front side plate backwardly bent from the left side and the right side of the front plate respectively;

a left first front side hinge bracket, a right first front side hinge bracket, a left second front side hinge bracket, and a right second front side hinge bracket in a lower end and an upper end of the left front side plate and the right front side plate, wherein the first front side hinge shaft and the second front side hinge shaft are mounted respectively; and wherein the rear side link comprises:

a rear plate;

a left rear side plate and a right rear side plate forwardly bent from the left side and the right side of the rear plate, respectively, so as to face the left front side plate and the right front side plate, respectively; and a left first rear side hinge bracket and a right second rear side hinge bracket formed in a lower end and an upper end of the left rear side plate and the right rear side plate, respectively, wherein the left front side plate and the right front side plate are in contact with upper sides of the left rear side plate and the right rear side plate respectively when the front side link and the rear side link are returned to their original position.

4. The headrest sliding device according to claim 3, wherein protrusions are formed in the upper end surfaces of the left front side plate and the right front side plate, and slots are formed in upper end surfaces of the left rear side plate and the right rear side plate where the protrusions are contacted with.

* * * * *